US009965312B2

(12) United States Patent
Wu et al.

(10) Patent No.: US 9,965,312 B2
(45) Date of Patent: *May 8, 2018

(54) REMOTE DEBUGGING AS A SERVICE

(71) Applicant: Microsoft Technology Licensing, LLC., Redmond, WA (US)

(72) Inventors: Sung Hon Wu, Bellevue, WA (US); Lubomir Birov, Redmond, WA (US); Anthony Crider, Mill Creek, WA (US); Jeffrey Young, Snoqualmie, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/010,869

(22) Filed: Jan. 29, 2016

(65) Prior Publication Data
US 2016/0162322 A1 Jun. 9, 2016

Related U.S. Application Data

(63) Continuation of application No. 13/398,851, filed on Feb. 17, 2012, now Pat. No. 9,251,039.

(51) Int. Cl.
*G06F 9/455* (2006.01)
*G06F 11/36* (2006.01)

(52) U.S. Cl.
CPC ...... *G06F 9/45558* (2013.01); *G06F 11/3664* (2013.01); *G06F 2009/45591* (2013.01); *G06F 2009/45595* (2013.01)

(58) Field of Classification Search
CPC ............. G06F 9/45558; G06F 11/3664; G06F 2009/45591; G06F 2009/45595
See application file for complete search history.

(56) References Cited

U.S. PATENT DOCUMENTS 5,819,093 A   10/1998   Davidson et al.
6,263,456 B1   7/2001   Boxall et al.
(Continued)

FOREIGN PATENT DOCUMENTS

CN   1825851 A   8/2006
CN   102195970 A   9/2011
EP   1234235   3/2004

OTHER PUBLICATIONS

European Patent Office, "Supplementary European Search Report," received for European Patent Application No. 13749255.9, dated Sep. 1, 2015, 9 Pages.
(Continued)

*Primary Examiner* — Viva Miller
(74) *Attorney, Agent, or Firm* — Fogarty LLP

(57) ABSTRACT

Debugging capabilities for software running in a cloud-computing environment are disclosed. A controller identifies which machines in the cloud are running instances of software to be debugged. An agent is deployed onto the machines in the cloud to facilitate communication with the developer's machine. When the developer wants to debug software on the agent's machine, the agent downloads and installs a monitor onto the machine. The agent configures the machine for remote debugging via the monitor. A security mechanism ensures that only authenticated developers can access the monitor and the remote machine for debugging. A controller automatically determines which machines can be debugged, updates a list of processes available for debugging on the machines, and identifies how to connect a developer's debugging client to the machines. The controller permits remote debugging only upon request from an authenticated developer and only for those processes that the developer is permitted to debug.

13 Claims, 4 Drawing Sheets

(56) References Cited

U.S. PATENT DOCUMENTS

| | | | |
|---|---|---|---|
| 7,512,934 | B2 | 3/2009 | Gatlin et al. |
| 7,673,180 | B1 | 3/2010 | Chen et al. |
| 2002/0062463 | A1 | 5/2002 | Hines |
| 2004/0123271 | A1 | 6/2004 | Bindewald et al. |
| 2004/0172623 | A1 | 9/2004 | Eckels et al. |
| 2004/0267779 | A1 | 12/2004 | Carter et al. |
| 2005/0172168 | A1 | 8/2005 | Kilian |
| 2006/0048098 | A1 | 3/2006 | Gatlin et al. |
| 2006/0101418 | A1 | 5/2006 | Barsness et al. |
| 2007/0143301 | A1 | 6/2007 | Tran |
| 2007/0168997 | A1 | 7/2007 | Tran |
| 2007/0234297 | A1 | 10/2007 | Zorn et al. |
| 2009/0106739 | A1 | 4/2009 | Weatherbee et al. |
| 2009/0210862 | A1 | 8/2009 | Viswanadha et al. |
| 2010/0077385 | A1 | 3/2010 | Flores Assad et al. |
| 2010/0162049 | A1 | 6/2010 | Stall et al. |
| 2010/0192121 | A1 | 7/2010 | Unnithan et al. |
| 2011/0088015 | A1 | 4/2011 | Shillington et al. |
| 2011/0145836 | A1 | 6/2011 | Wheeler et al. |
| 2011/0225459 | A1 | 9/2011 | Fahrig et al. |
| 2011/0225460 | A1 | 9/2011 | Stairs et al. |
| 2011/0252404 | A1 | 10/2011 | Park et al. |
| 2011/0258614 | A1 | 10/2011 | Tamm |
| 2012/0084757 | A1 | 4/2012 | Tamiya |
| 2012/0131555 | A1 | 5/2012 | Hossain et al. |

OTHER PUBLICATIONS

"International Search Report", dated Jun. 2, 2013, Application No. PCT/US2013/025483, Filed Date: Feb. 11, 2013, pp. 10.
Abramson, et al., "Relative Debugging: A new methodology for debugging scientific applications", Retrieved at <<http://www.csse.monash.edu.au/-davida/papers/cacm.pdf>>, Communications of the ACM, Nov. 1996, pp. 69-77.
Solnica, et al., "Remote debugging with Visual Studio 2010", Retrieved at <<http://www.codeproject.com/Articles/146838/Remote-debugging-with-Visual-Studio-2010>>, Jan. 16, 2011, pp. 3.
"Remote Debugger", Retrieved at <<http://pydev.org/manual_adv_remote_debugger.html>>, Nov. 2, 2011, pp. 3.
"Final Office Action Issued in U.S. Appl. No. 13/398,851", dated Jan. 15, 2015, 16 Pages.
"Final Office Action Issued in U.S. Appl. No. 13/398,851", dated Oct. 23, 2013, 23 Pages.
"Non-Final Office Action Issued in U.S. Appl. No. 13/398,851", dated Apr. 3, 2013, 19 Pages.
"Non-Final Office Action Issued in U.S. Appl. No. 13/398,851", dated Aug. 13, 2014, 15 Pages.
"Notice of Allowance Issued in U.S. Appl. No. 13/398,851", dated Oct. 28, 2015, 3 Pages.
"Notice of Allowance Issued in U.S. Appl. No. 13/398,851", dated Sep. 25, 2015, 8 Pages.
"First Office Action and Search Report Issued in Chinese Patent Application No. 201380009889.3", dated Nov. 27, 2015, 15 Pages.
"Second Office Action Issued in Chinese Patent Application No. 201380009889.3", dated Jul. 20, 2016, 7 Pages.
SIPO, "Third Office Action Issued in Chinese Patent Application No. 201380009889.3", dated Jan. 22, 2017, 8 Pages.
"Communication pursuant to Article 94(3) EPC," Office Action issued in European Patent Application No. 13749255.9, dated Oct. 6, 2016, 7 Pages.
MSDN, "Remote Debugging Permissions", Retrieved from <<https://web.archive.org/web/20110902225344/http://msdn.microsoft.com/en-us/library/z3bxds0s(v=VS.90).aspx>>, Retrieved on: Sep. 22, 2016, 1 Page.
MSDN, "Setting Debug Permissions", Retrieved from <<https://msdn.microsoft.com/en-us/library/aa291232(v=vs.71).aspx>>, Retrieved on: Sep. 22, 2016, 2 Pages.

REMOTE DEBUGGING AS A SERVICE

CROSS-REFERENCE TO RELATED APPLICATIONS

This application is a continuation of U.S. patent application Ser. No. 13/398,851, filed Feb. 17, 2012, and issued on Feb. 2, 2016 as U.S. Pat. No. 9,251,039, the disclosure of which is hereby incorporated herein in its entirety.

BACKGROUND

Debugging is the process of finding and fixing errors or "bugs" in software. Generally, developers debug a process or an instance of a computer program. A software tool referred to as a "debugger" is typically used to help software developers debug their software. Remote debugging is the process of debugging software that is running on a different machine than the machine that the developer is using to write, analyze or debug the software. A "remote debugger" tool is used by developers to do remote debugging. Remote debuggers typically have two parts. Monitor software runs on the remote machine and enables the developer's machine to attach to the remote machine and to debug software on the remote machine. Client software runs on the developer's machine and connects to the monitor thereby providing an interface for the developer to debug software on the remote machine.

Recently, it has become common for software development to be performed in a cloud-computing environment. In this context, software that a developer may want to debug is running on servers that the developer does not own or control. Instead, the servers that running the software are often located in a remote datacenter that is owned and/or administered by a third party. Additionally, the developer and third party usually do not know which machines in the cloud environment are actually running the software to be debugged. A management entity in the cloud-computing environment evaluates demand for the software and other factors, such as load-sharing requirements and machine availability, and dynamically selects which machines (and how many machines) should run the software. As a result, it is difficult for the developer to determine which servers in the cloud are running the software. In many cases, the owner or administrator of the servers in the cloud environment limit the developer's access to the servers and software so that only certain processes may be debugged.

Servers and other machines in the cloud-computing environment may be accessed via distributed public and/or private computer networks, such as the Internet or intranets. To connect to machines in the cloud-computing environment, the developer typically needs to use the public Internet for at least part of the connection. Even if the developer could identify which machines are running the software, some servers in the cloud environment may be difficult to access from the public Internet. As a result, it may be difficult to achieve a direct network TCP/IP connection between the developer's machine and the machine running the software to be debugged in the cloud-computing environment.

Errors, bugs, and other faults in the software may not be noticed until the software has been running for long periods of time. Accordingly, machines running the software do not need to be debuggable all the time, but only need to be configured for debugging when the developer wants to or needs to debug the software.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments provide debugging capabilities for software running in a cloud-computing environment. A controller identifies which machines in the cloud are running instances of software to be debugged. An agent is deployed onto the machines in the cloud. The agent facilitates communication with the developer's machine. When the developer wants to debug software on the agent's machine, the agent downloads and installs a monitor onto the machine. The agent configures the machine for remote debugging via the monitor. A security mechanism ensures that only authenticated developers can access the monitor and the remote machine for debugging.

In one embodiment, a software application in the cloud automatically determines which machines can be debugged, updates a list of processes that can be debugged on the machines, such as a list of process identifiers, and identifies how to connect a developer's debugging client to the machines.

In another embodiment, a software application running in the cloud permits remote debugging only upon request from an authenticated developer. The application removes access to the remote process after the developer is finished debugging. The application lists only those processes that the developer is permitted to debug. All other processes are filtered out so that the developer does not see processes for which he has no permission.

In a further embodiment, a software application enables a remote debugger to be downloaded and configured on a remote machine running the cloud.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
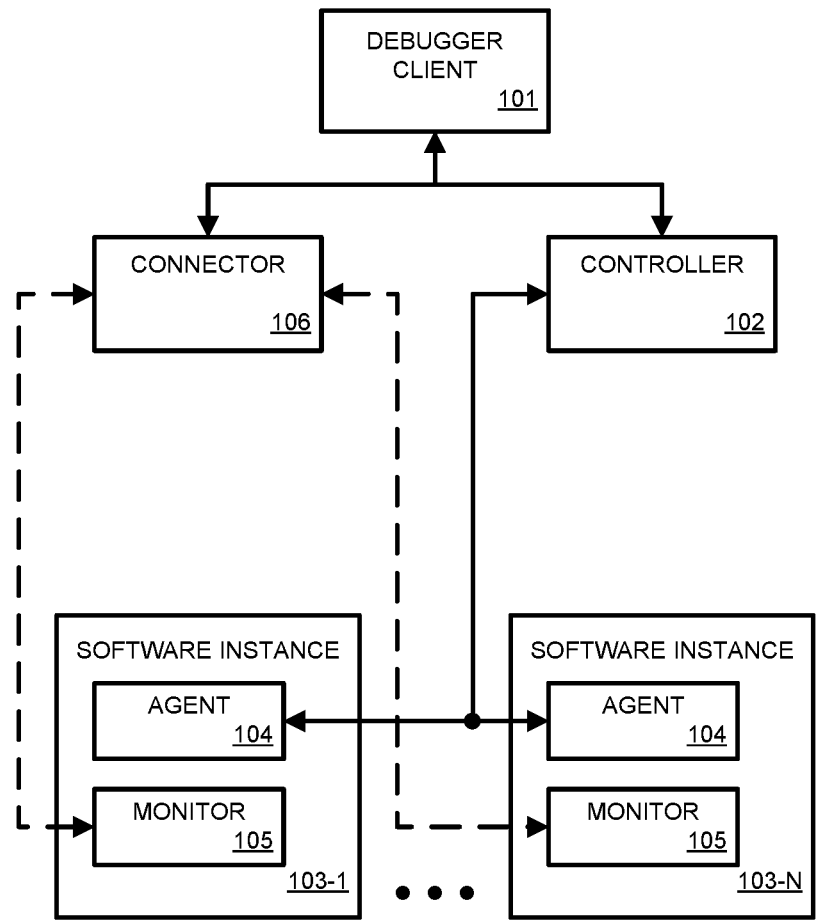
FIG. 1 is a block diagram of a system for remote debugging in a cloud environment according to one embodiment.

FIG. 1 is a block diagram of a system for remotely debugging software in a cloud environment according to one embodiment. Debugger client 101 is used by developers to debug software applications. Debugger client 101 may be a stand-alone application or is may be a component of an integrated development environment (IDE) that allows the developer to design and debug software applications. Controller 102 is a software application that identifies and monitors configuration details for the cloud environment. Controller 102 has the capability to query the cloud environment for details about which machines are running instances 103 of the software to be debugged by the developer. Any number of software instances 103 may be running at one time. Multiple software instances 103 may be running on the same machine and/or may be spread across a number of different machines.

Controller 102 provides machine identities, process identities and any other necessary information to debugger client 101 so that the developer can debug the software instances 103 running on the various remote machines. Controller 102 may update the cloud environment details, such as machine identities and process identities for the software instances 103 to be debugged interest, on constant basis so debugger client 101 and the developer always have the most correct information for debugging. In one embodiment, the controller 102 only returns information for processes running on machines for which debugger client 101 has permission to access. If the owner of the machine has not given user permission to the developer or debugger client, then the controller 102 does not identify those software instances to prevent attempts to debug processes for which the developer does not have permission.

Agents 104 are deployed for each software instance 103 or for each machine that is running one or more software instances 103. Agents 104 communicate with the debugger client 101 via controller 102. Agents 104 listen for commands indicating that the developer wants to debug software 103 on the machine. In one embodiment, controller 102 may order agents 104 to configure or setup a machine for debugging. Agents 104 may be software applications that have the capability to download and install a monitor 105. Agents 104 then configure the machine, such as by opening firewall ports, setting proper permissions, etc., so that monitor 105 can run on the machine.

Connector 106 is a software application that runs in the cloud environment. Connector 106 acts as an bridge for connections from debugger client 101 on the public Internet to monitors 105, which are running on machines that are not publically accessible. Connector 106 may be a router, for example, that authenticates the connections and routes requests from debugger client 101 to the appropriate monitor 105.

The agent 104 software may be deployed along with the software code to be debugged, or it may be deployed at a later time.

Figure 2:
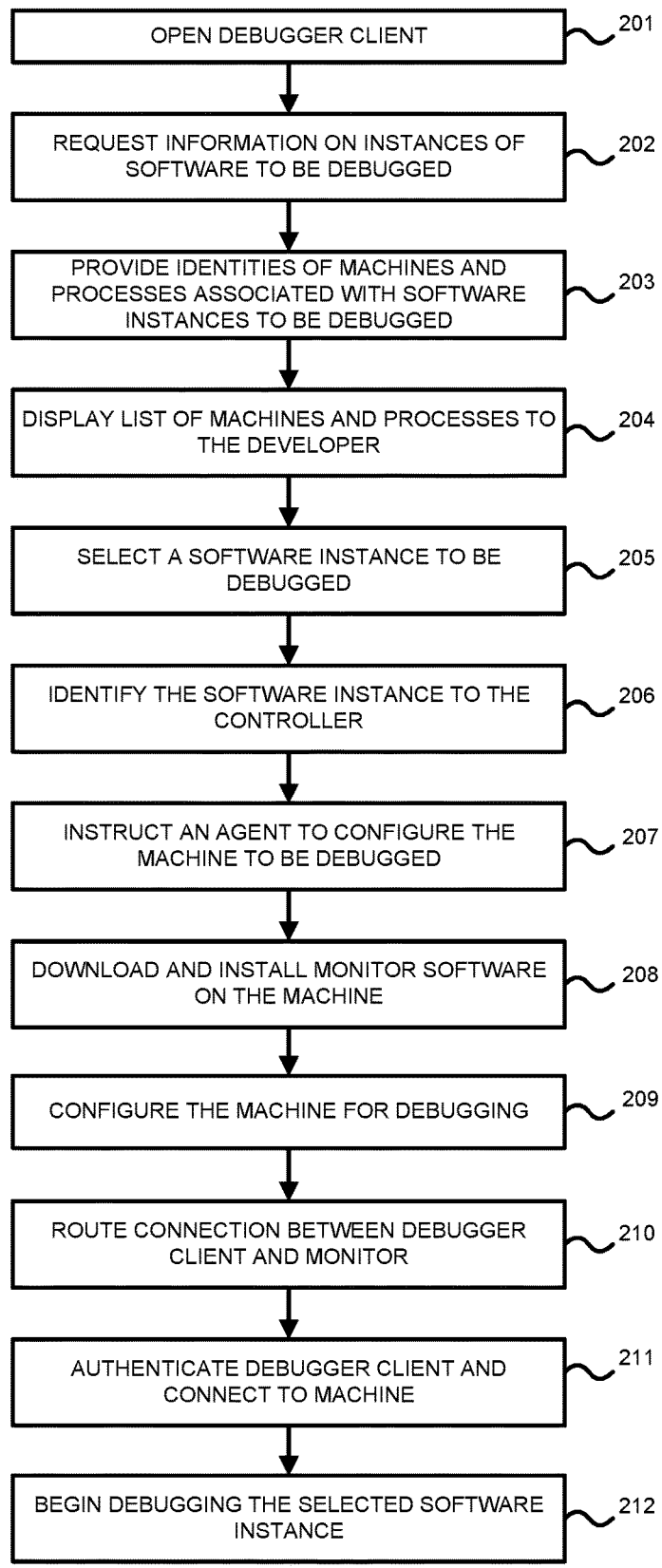
FIG. 2 is a flowchart illustrating a process or method for debugging software on remote machines in a cloud environment.

FIG. 2 is a flowchart illustrating a process or method for debugging software on remote machines in a cloud environment. In step 201, the developer opens a debugger client and select software code to be debugged. In step 202, the debugger client communicates with the controller to identify instances of the software to be debugged that are running in a cloud environment. In step 203, the controller identifies the machines and processes associated with the software instances to be debugged by requesting agent applications on the remote machines for software status information, for example. The agent applications provide software status information to the controller, which then sends a list of machines and process for display to the developer in step 204. Using the debugger client in step 205, the developer selects one or more software instance to be debugged. The software instance may be identified, for example, as a particular process running on one of the machines.

In step 206, the debugger client identifies the software instance to be debugged to the controller. In step 207, the controller then instructs the agent on the machine associated with the software instance to configure the machine for remote debugging. The agent downloads and installs the monitor software on the machine in step 208, if the monitor is not already available. The agent configures the machine in step 209, for example, by adding appropriate permissions and user accounts, opening firewall ports, and starting the monitor software.

The debugger client talks to the connector in step 210, which routes the connection to the appropriate monitor. In some embodiments, the debugger client may not be able to directly reach the software running on the machine. However, the connector provides and manages interfaces between the public Internet and private network connections in the cloud environment. The connector authenticates the debugger client and then connects the client and machine in step 211. The developer may then start debugging the selected remote software instance in step 212.

It will be understood that steps 201-212 of the process illustrated in FIG. 2 may be executed simultaneously and/or sequentially. It will be further understood that each step may be performed in any order and may be performed once or repetitiously in other embodiments.

Figure 3:
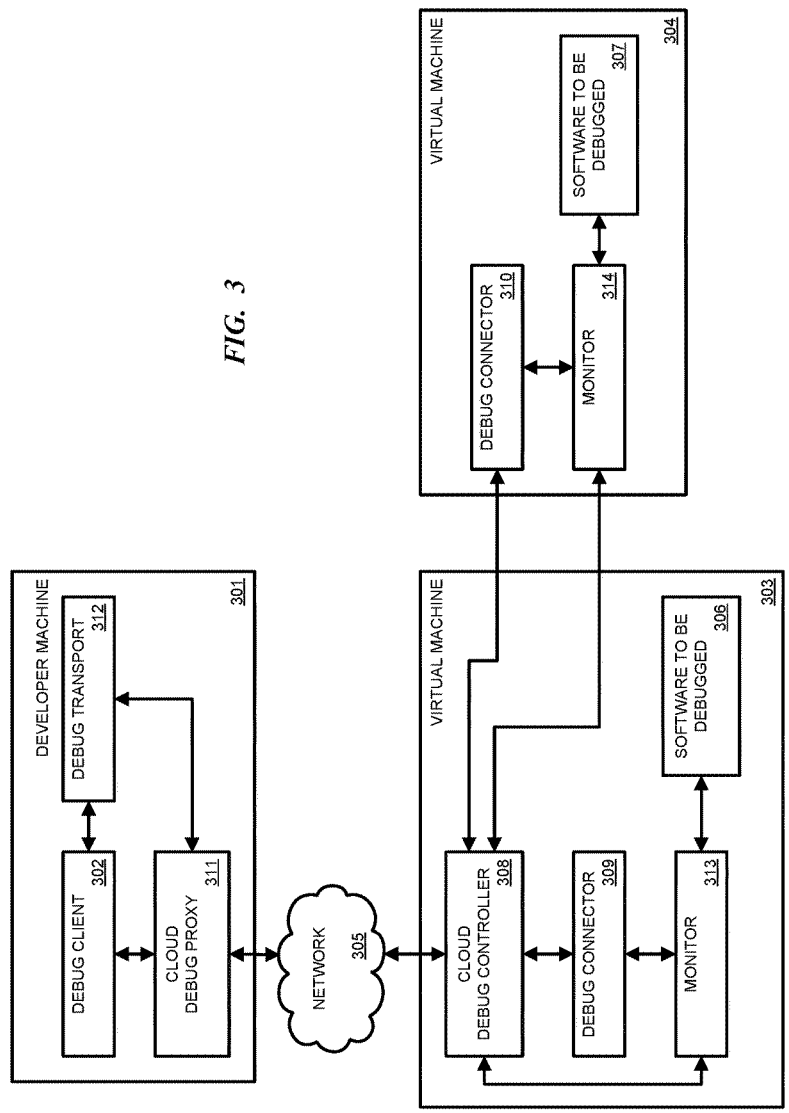
FIG. 3 is a block diagram of a system for remote debugging in a cloud environment according to another embodiment.

FIG. 3 is a block diagram of a system for remote debugging in a cloud environment according to another embodiment. A software developer uses developer machine 301, which is running a debugger client 302, such as an IDE application. The developer may want to debug software on remote machines or servers. As illustrated in FIG. 3, the remote machines may be virtual machines 303, 304 that are in a cloud environment that is accessible only via a public or private network 305, such as the Internet or an intranet.

Multiple instances 306, 307 of the software to be debugged may be deployed on the virtual machines 303, 304. A cloud debug controller 308 is used to identify the instances 306, 307 of the software. In one embodiment, a single instance of the cloud debug controller 308 is deployed to one of the virtual machines 303, 304. Additionally, a debug connector 309, 310 is deployed to every virtual machine 303, 304. Working with the cloud debug controller 308, the debug connectors 309, 310 act as agents to configure the machines 303, 304 to be debugged. The cloud debug connector 308 and debug connectors 309, 310 may be deployed with software instances 306, 307 or loaded at a later time when debugging is initiated on developer machine 301.

Cloud debug controller 308 discovers the topology of the cloud environment using information from the cloud environment runtime and framework. Cloud debug controller 308 discovers the debug controllers 309, 310 and establishes a connect to them. Cloud debug controller 308 acts as a gateway and provides a visible connection into the cloud environment for developer machine 301. Cloud debug proxy 311 provides a bridge between debug transport 312 on the developer machine 301 and the cloud debug controller 308. In one embodiment, debug transport 312 creates a composite view of the cloud topology for the debug client 302. In a cloud computing environment, the machine names, IP addresses, port numbers, and process names for the software instances may change as the workload is dynamically balanced. Debug transport 312 presents the software instances as single application for debugging to debug client 302. In this way, the debug client 302 and the developer do not have to continually track the information for each software instance.

The cloud debug controller 308 and debug connectors 309, 310 identify instances of the software to be debugged. The list of software instances may be filtered to include only those processes that can be debugged by developer machine 301. For example, if the developer does not have permission to access a virtual machine or process or if the owner of the machine has otherwise restricted debug capabilities, software instances on those machines are not be listed to the debug client 302.

Monitor software 313, 314 is loaded onto virtual machines 303, 304 for debugging software 306, 307. Monitor software 313, 314 may be deployed with the software instance or debug connector 309, or may be deployed later by cloud debug controller 308.

To debug software, the debug client 302 sends a request to cloud debug controller 308 to discover the network topology. Cloud debug controller 308 communicates with the connectors 309, 310 and request information about instances of the software to be debugged. The cloud debug controller 308 passes the information to debug client 302, which displays how many machines, processes, and/or software instances have been discovered. The developer may then select one or all of the machines, processes and/or instances to debug. In one embodiment, an interface or visualization is provided that allows users to choose to simultaneously remote debug all instances of a software application that are running on different machines. The user may select this simultaneous debugging across all machines in one action, such as in one click or selection. A connection is then automatically established by the system between debug client 302 and monitor 313, 314 for the selected software instances. The developer may then access the selected software instances via the monitor 313, 314.

Figure 4:
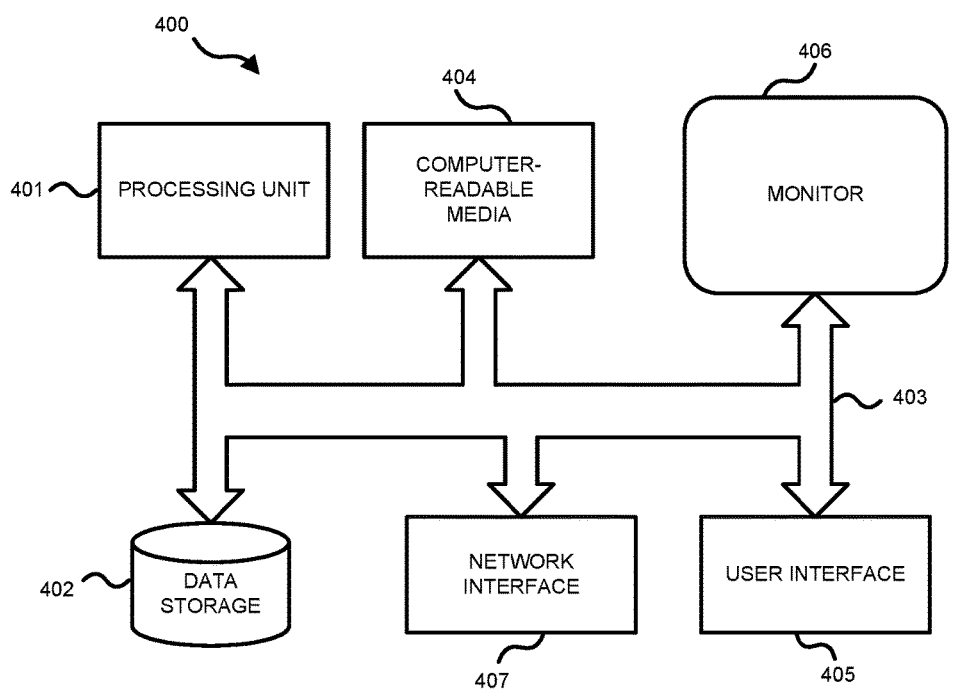
FIG. 4 illustrates an example of a suitable computing and networking environment 400, such as a developer machine and/or remote cloud-based servers in one embodiment.

FIG. 4 illustrates an example of a computing and networking environment 400, such as a developer machine and/or remote cloud-based servers in one embodiment, that supports the debugger client and/or remote software instances being debugged as well as facilitate the connection of the developer machine and remote servers using controller, connectors, agents and monitors as described herein. The computing system environment 400 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The debug client, controller, connector, agent, monitor and software instances being debugged may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 400. Components may include, but are not limited to, various hardware components, such as processing unit 401, data storage 402, such as a system memory, and system bus 403 that couples various system components including the data storage 402 to the processing unit 401. The system bus 403 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 typically includes a variety of computer-readable media 404. Computer-readable media 404 may be any available media that can be accessed by the computer 401 and includes both volatile and nonvolatile media, and removable and non-removable media, but excludes propagated signals. By way of example, and not limitation, computer-readable media 404 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 402 includes computer storage media in the form of volatile and/or nonvolatile memory such as read only memory (ROM) and random access memory (RAM). A basic input/output system (BIOS), containing the basic routines that help to transfer information between elements within computer 400, such as during start-up, is typically stored in ROM. RAM typically contains data and/or program modules that are immediately accessible to and/or presently being operated on by processing unit 401. By way of example, and not limitation, data storage 402 holds an operating system, application programs, and other program modules and program data.

Data storage 402 may also include other removable/non-removable, volatile/nonvolatile computer storage media. By way of example only, data storage 402 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information through a user interface 405 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 401 through a user input interface 405 that is coupled to the system bus 403, but may be connected by other interface and bus structures, such as a parallel port, game port or a universal serial bus (USB). A monitor 406 or other type of display device is also connected to the system bus 403 via an interface, such as a video interface. The monitor 406 may also be integrated with a touch-screen panel or the like. Note that the monitor and/or touch screen panel can be physically coupled to a housing in which the computing device 400 is incorporated, such as in a tablet-type personal computer. In addition, computers such as the computing device 400 may also include other peripheral output devices such as speakers and printer, which may be connected through an output peripheral interface or the like.

The computer 400 may operate in a networked or cloud-computing environment using logical connections 407 to one or more remote devices, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 400 may be connected to a public or private network through a network interface or adapter 407. In some embodiments, a modem or other means for establishing communications over the network. The modem, which may be internal or external, may be connected to the system bus 403 via the network interface 407 or other appropriate mechanism. A wireless networking component such as comprising an interface and antenna may be coupled through a suitable device such as an access point or peer computer to a network. In a networked environment, program modules depicted relative to the computer 400, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:
a processor; and
a memory coupled to the processor, the memory having program instructions stored thereon that, upon execution by the processor, cause the computer system to:
identify, via a debug controller running on a first virtual machine (VM), a selected second VM from among a plurality of distributed VMs, wherein the first VM is configured to execute a first instance of a software application, and wherein the selected second VM is configured to execute a second instance of the software application;
configure, via the debug controller, a debug connector running on the selected second VM for remote debugging;
identify, via the debug controller, one or more processes on the selected second VM that are not permitted to be debugged due to restricted debug capabilities set by the selected second VM's owner; and
establish a connection through the debug controller between a remote debug client running on a developer machine and the debug connector running on the selected second VM, while preventing a developer operating the remote debug client from seeing the identified one or more processes.

2. The computer system of claim 1, wherein the debug controller configures the debug connector for remote debugging in response to an instruction from the remote debug client running on the developer machine.

3. The computer system of claim 1, wherein the remote debug client is configured to receive a single input from a user indicating that all instances of the software application on the selected second VM should be selected and debugged.

4. The computer system of claim 1, wherein the debug controller configures the selected second VM for debugging by opening firewall ports to the selected second VM.

5. The computer system of claim 1, wherein the debug controller configures the selected second VM debugging by downloading and installing a monitoring application on the selected second VM.

6. The computer system of claim 1, wherein the debug controller provides and manages interfaces between the developer machine on a public network and machines running the software application on a private network.

7. The computer system of claim 1, wherein the debug connector authenticates the remote debug client before connecting the remote debug client and a second VM.

8. A computer system, comprising:
a processor; and a memory coupled to the processor, the memory having program instructions stored thereon that, upon execution by the processor, cause the computer system to:

send an instruction via a debug client to a remote debug controller running on a first virtual machine (VM), wherein the instruction directs the first VM to identify a second VM among a plurality of distributed VMs, wherein the first VM is configured to execute a first instance of a software application, and wherein the second VM is configured to execute a second instance of the software application;

send another instruction via the debug client to the remote debug controller, wherein the other instruction directs the remote debug controller to configure a debug connector on the second VM for remote debugging, and wherein the debug connector identifies one or more processes in the second VM that are not permitted to be debugged due to restricted debug capabilities; and establish, via the debug client, a connection to the debug connector running on the second VM through the remote debug controller running on the first VM while preventing a developer operating the debug client from seeing the identified one or more processes.

9. The computer system of claim 8, wherein the debug client is configured to receive a user input indicating that all instances of the software application on all machines should be selected and debugged.

10. The computer system of claim 8, wherein the debug client instructs the remote debug controller to configure the second VM for debugging by opening firewall ports to the second VM.

11. The computer system of claim 8, wherein the debug client instructs the remote debug controller to configure the second VM debugging by downloading and installing a monitoring application on the second VM.

12. The computer system of claim 8, wherein the debug connector provides and manages interfaces between the debug client and machines running the software application on a private network.

13. The computer system of claim 8, wherein the debug connector authenticates the debug client before connecting the debug client and the second VM.

* * * * *